US012325449B1

(12) United States Patent
Agarwal et al.

(10) Patent No.: US 12,325,449 B1
(45) Date of Patent: Jun. 10, 2025

(54) SAFE VEHICLE OPERATION USING LOG DATA

(71) Applicant: Zoox, Inc., Foster City, CA (US)

(72) Inventors: Kshitij Agarwal, Redwood City, CA (US); Thomas Bernard Gacka, Redwood City, CA (US); Pengzhi Tian, Dublin, CA (US); Julia A. Wyatt, Sudbury, MA (US); Gerrit Bagschik, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 334 days.

(21) Appl. No.: 18/176,370

(22) Filed: Feb. 28, 2023

(51) Int. Cl.
B60W 30/095 (2012.01)
B60W 50/02 (2012.01)
B60W 60/00 (2020.01)
G07C 5/04 (2006.01)

(52) U.S. Cl.
CPC .... B60W 60/0015 (2020.02); B60W 30/0956 (2013.01); B60W 50/0225 (2013.01); G07C 5/04 (2013.01); B60W 2520/10 (2013.01); B60W 2520/105 (2013.01); B60W 2554/4042 (2020.02); B60W 2554/804 (2020.02)

(58) Field of Classification Search
CPC ......... B60W 60/0015; B60W 30/0956; B60W 50/0225; B60W 2520/10; B60W 2520/105; B60W 2554/4042; B60W 2554/804; G07C 5/04
See application file for complete search history.

Primary Examiner — Ashley L Redhead, Jr.
(74) Attorney, Agent, or Firm — Lee & Hayes, P.C.

(57) ABSTRACT

Techniques are discussed herein for generating and evaluating autonomous vehicle control systems. In examples, a driving scenario is determined and log data, e.g., generated from user-supported vehicles travelling in an environment, may be used to determine instances in which vehicles experience the driving scenario. Based on the log data, an exposure metric, a severity metric, and/or a controllability metric may be determined. A safety goal can be determined from the metric(s) and vehicle control parameters are determined to comport with the safety goal. The vehicle control parameters may be used to control an autonomous vehicle in the environment.

20 Claims, 5 Drawing Sheets

SAFE VEHICLE OPERATION USING LOG DATA

BACKGROUND

Vehicles are increasingly supplementing or replacing manual functionality with automatic controls. Autonomous driving may benefit from computing systems capable of making split-second decisions to respond to myriad events and scenarios, including vehicle reactions to dynamic objects operating in an environment of the vehicle. As a precursor to being approved for autonomous driving on public roadways, suitability of autonomous vehicle control systems may be validated via test runs on conventional vehicles. More specifically, in some examples, test runs may be conducted in which a vehicle is controlled by the autonomous vehicle control system with a conventional driver alert to operation of the vehicle and ready to take over control should an unsafe situation arise. Executing the test runs can include generating relatively large amounts of vehicle data, including, for example, control data, trajectory data, sensor data, and/or the like. This data may be useful to determine the suitability of the autonomous vehicle control system, but it may also have other uses.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
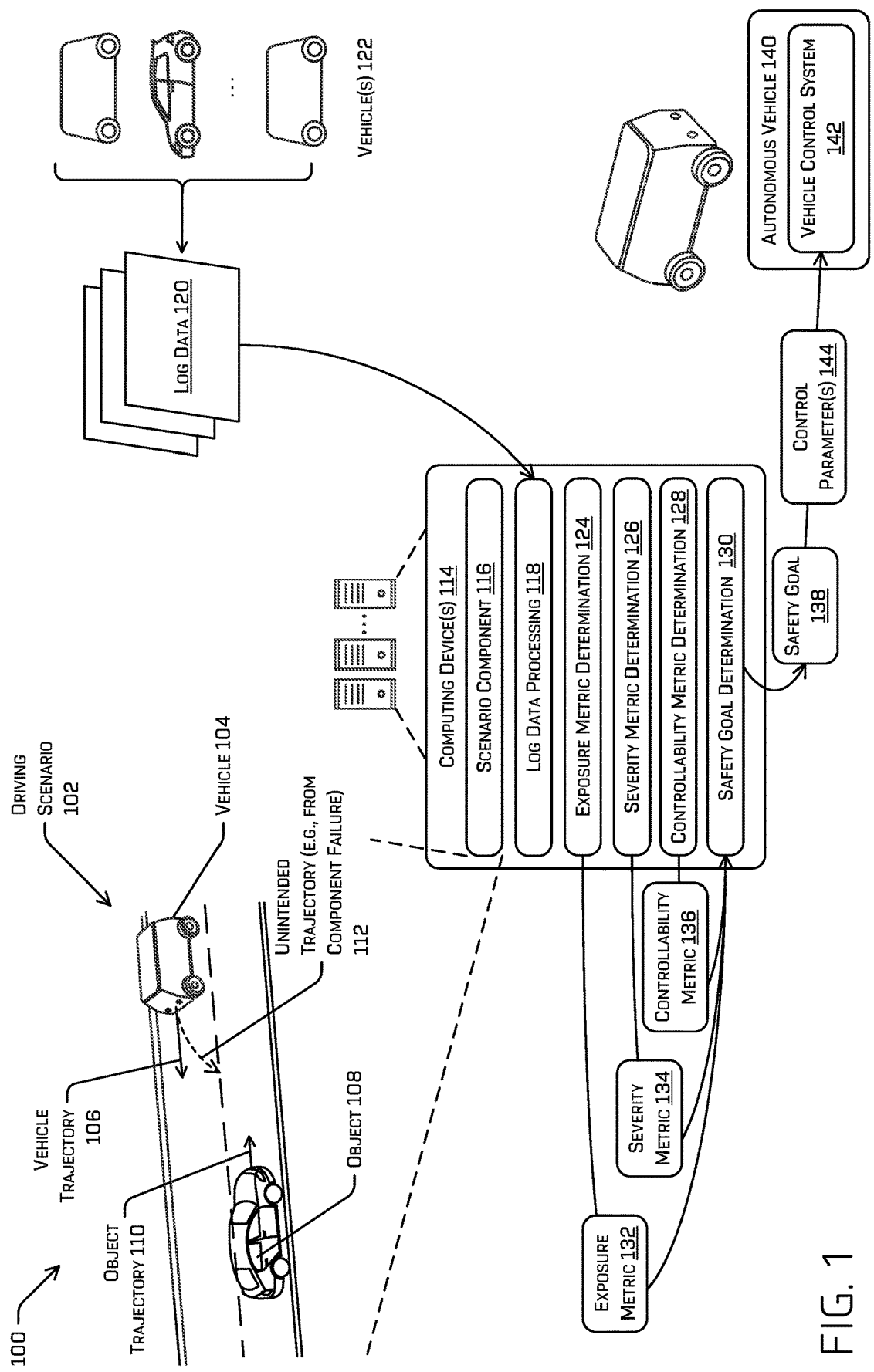
FIG. 1 illustrates techniques for generating and implementing safety goals for an autonomous vehicle using driving scenarios and historical driving data associated with the driving scenarios, in accordance with one or more implementations of the disclosure.

Techniques described herein relate to providing improved techniques and methods for designing and implementing control systems, such as autonomous vehicle control systems. For example, techniques described herein may include using log data, e.g., data received and/or generated based on other data (e.g., sensor data, control messages, component state messages, etc.) and collected over numerous drive missions in a drive area by one or more vehicles, to identify instances of a driving scenario and generate safety goals. An autonomous vehicle control system may function in accordance with the safety goals to mitigate unsafe outcomes should the autonomous vehicle encounter the driving scenario during (autonomous) operation in the driving area. By determining safety goals according to the techniques described herein, control systems of autonomous vehicles can be configured and/or adapted to decrease risk associated with occupant injury, vehicle damage, and/or environmental damage during a collision event.

Example techniques described herein can include generating safety goals that may be used to control autonomous vehicles in one or more driving scenarios. For example, an outcome (whether positive or negative) associated with a driving scenario may be associated with a culmination of factors, e.g., vehicle-related factors and/or environment-related factors. In examples, some driving scenarios may be associated with a culmination of factors associated with a malfunction of the autonomous vehicle and/or a culmination of factors in which, should an autonomous vehicle experience an unintended control condition, e.g., an unintended acceleration, an unintended deceleration, unintended steering, a loss of acceleration, a loss of braking, or the like, a hazardous event, e.g., a collision, may result. In examples, the unintended control conditions can include hardware and/or software malfunctions.

Processes described herein can include identifying the one or more driving scenarios discussed above, and mining one or more data logs to determine occurrences of conditions or factors associated with the scenario(s). For example, data log(s) can include log data associated with operation of a vehicle in an environment. In some examples, log data can be generated by sensors and/or computing devices disposed on a vehicle and/or in the environment. Log data can also include data generated by a computing system, e.g., using sensor data associated with an environment. In at least some examples, log data may be generated by one or more vehicles, e.g., a fleet of vehicles, operating in an environment. In some instances, the log data can be generated by vehicles that are not fully autonomous, e.g., SAE level 3 (L3) vehicles, which may be equipped with autonomous functionality, but that also include a driver or other operator and associated driving controls that allow the driver/operator to assume control of the vehicle in some circumstances.

In some aspects of this disclosure, instances of the driving scenario are determined from the data logs, and the techniques described herein can determine an exposure metric based on the instances. The exposure metric may correspond to a probability, frequency, or other metric associated with whether and/or how often vehicles operating in the environment are likely to encounter the driving scenario. For example, the techniques described herein can determine, e.g., for a predetermined amount of time, a number of times that a vehicle encounters the driving scenario, an aggregated time in which the vehicle is exposed to the driving scenario, and/or the like. In some examples, an exposure metric can be a band of probabilities or times, e.g., less than 0.1% exposure, from 0.1% to 1% exposure, 1%-10% exposure, and/or the like.

The techniques described herein can also include using the log data to determine outcomes associated with the identified scenarios and/or associated likelihoods. For example, the log data can include positional information about the vehicle and/or objects near the vehicle. In examples, the positional data can be used to estimate, simulate, or otherwise determine a potential outcome for the scenario, e.g., should the vehicle experience some malfunction resulting in unintended controlling, control limitations, and/or other potential hazardous issues. In examples the outcome(s) can be used to determine a severity metric and/or a controllability metric.

In examples, a severity metric may be representative of a severity of a hazardous event resulting from a vehicle malfunction. The severity metric may be associated with a severity of injury or harm resulting from a collision, e.g., with an object in the environment. The severity metric can also, or alternatively, be based at least in part on a likely speed at a time of collision. In examples, the techniques described herein can include simulating a malfunction using log data, e.g., to determine a likelihood of a hazardous event and/or characteristics associated with the hazardous event, including but not limited to a time to collision, a relative velocity at collision, pose information associated with the collision, and/or other information.

The controllability metric may be associated with a likelihood that an object can mitigate an outcome of a hazardous event. For example, in the example in which the scenario may result in an unintended collision of an autonomous vehicle with another automobile, the controllability metric can be based at least in part on an estimation of how long it will take an automobile to identify the malfunctioning autonomous vehicle and take evasive action. In some examples, the controllability metric can be based on kinematic parameters, which may, in turn, be based at least in part on empirical data, e.g., from real-world driving studies, simulated driving studies, and/or the like.

In at least some examples, a safety goal for an autonomous vehicle may be determined based at least in part on the exposure metric, the severity metric, and/or the controllability metric. For example, a safety goal may be determined that requires the autonomous vehicle to greatly reduce or eliminate outcomes that are above a predetermined severity in areas that have an exposure metric above a threshold exposure. Other safety goals can also be based on the controllability metric, e.g., the techniques described herein can determine a safety goal in which the vehicle is controlled in a manner to ensure that the autonomous vehicle will avoid instances in which the controllability metric comports to some predetermined controllability threshold.

The techniques described herein can also include controlling an autonomous vehicle to comply with the determined safety goals. For example, the techniques described herein can determine and implement operating parameters to be implemented at an autonomous vehicle. In one example, and without limitation, the techniques described herein can determine, based on a safety goal, a minimum distance, e.g., lateral distance, to maintain relative to another vehicle, a maximum speed to travel, and/or other operating conditions with which the autonomous vehicle is controlled. In still other examples, the techniques described herein can be used to design and/or validate software (e.g., a vehicle controller) executed on vehicles (e.g., autonomous vehicles), for instance, to ensure that the autonomous vehicle meets or exceeds the safety goals associated with the various scenarios. Furthermore, in additional or alternative examples, the techniques described herein can be useful to inform the hardware design of autonomous vehicles, such as optimizing placement of sensors on an autonomous vehicle, determining minimum performance characteristics of components (e.g., sensors, motors, controllers, etc.) to meet operational requirements, implement redundant systems, or the like.

In examples, the techniques and/or systems discussed herein may enhance safety of passengers in a vehicle and/or other individuals in proximity to the vehicle. For instance, implementations described herein may provide systems and techniques for controlling an autonomous vehicle, modifying autonomous vehicle control systems, designing autonomous vehicles, and/or otherwise implementing autonomous vehicle controls.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in an aviation or nautical context. Additionally, or alternatively, the techniques described herein may be used with real data (e.g., captured using sensor(s)), simulated data (e.g., generated by a simulator), or any combination thereof.

FIG. 1 illustrates a diagram 100 depicting certain systems and techniques for determining, evaluating, and/or implementing safety goals for driving scenarios.

In more detail, FIG. 1 illustrates an example driving scenario 102 including a driven or controlled vehicle 104. The example driving scenario 102 is intended to represent a real-world scenario and/or a real-world scenario modeled as a simulated scenario. In the example driving scenario 102, the vehicle 104 is travelling on a driving surface along a trajectory 106. Also in the example driving scenario 102, an object 108, e.g., another vehicle, is travelling along an object trajectory 110. In the example driving scenario 102, the vehicle 104 is travelling in a first direction (e.g., from right to left in the FIG.) and the object 108 is travelling in an opposite, second direction (e.g., from left to right in the FIG.) in an adjacent lane. During normal operation of both the vehicle 104 and the object 108, the vehicle 104 will continue along the vehicle trajectory 106 and the object 108 will continue along the object trajectory 110 such that the vehicle 104 and the object 108 safely pass each other.

As also illustrated in the example driving scenario 102, should the vehicle 104 suffer some malfunction, the vehicle 104 may deviate from the vehicle trajectory 106, e.g., along an unintended trajectory 112. For example, the unintended trajectory 112 may result from a component (e.g., hardware or software) failure that causes the vehicle to alternatively travel along the unintended trajectory 112. In the example, the unintended trajectory 112 is associated with a malfunction that results in an unintended lateral movement of the vehicle 104. Specifically, in the driving scenario 102, the vehicle 104 may experience a malfunction that causes the vehicle 104 to veer left, e.g., into the path of the object 108 travelling along the object trajectory. The example driving scenario 102 is for illustration only. As will be appreciated from the discussion herein, the systems and techniques disclosed herein may be used for a number of driving scenarios and unintended vehicle control outcomes. For instance, and without limitation, although the example driving scenario shows unintended lateral controlling in one direction (e.g., to the left of the direction of travel) other driving scenarios can include lateral controlling in the opposite direction, unintended acceleration, and/or unintended deceleration. Other example driving scenarios can result in loss of functionality, including but not limited to loss of acceleration, loss of deceleration, loss of steering capability, and/or the like. Example driving scenarios can include any unintended functionality that may result from a vehicle malfunction.

Aspects of this disclosure are associated with determining safety goals associated with driving scenarios, like the example driving scenario 102. For example, a safety goal may be one or more rules, limits, controls, and/or other vehicle factors for controlling an autonomous vehicle navigating a real world scenario corresponding to the example scenario 102, to mitigate (or eliminate) undesirable outcomes resulting from unintended controlling associated with a vehicle malfunction. In one example, a safety rule may comprise one or more drive control parameters for an autonomous vehicle navigating in a scenario corresponding to the example scenario 102 that cause the autonomous vehicle to perform in a desirable manner should the hypothetical autonomous vehicle encounter a malfunction that causes the unintended trajectory 112. Aspects of this disclosure also are associated with controlling an autonomous vehicle in accordance with the safety goal, e.g., in a manner that mitigates the outcome of the (potentially) hazardous event.

As illustrated in FIG. 1, aspects of this disclosure can include one or more computing devices 114. The computing device(s) 114 may be configured to perform operations associated with determining and/or implementing safety goals in autonomous vehicles. As illustrated, the computing device(s) 114 include a scenario component 116. The scenario component 116 may include functionality to generate and/or store information about driving scenarios, like the example driving scenario 102. In examples, individual of the scenarios can include information about the vehicle 104, one or more objects, like the object 108, one or more attributes of the environment, e.g., road or lane arrangements (intersection, multiple lanes travelling the same direction, adjacent lanes travelling in opposite directions, turns in the road, or the like), weather conditions, road surface types (e.g., gravel, asphalt, icy, dry), and/or any additional information.

The computing device(s) 114 can further include a log data processing component 118. The log data processing component 118 can include functionality to receive and/or access the log data 120, e.g., as one or more data logs. For example, the log data 120 may be generated by one or more vehicles 122. The vehicle(s) 122 are vehicles that have travelled through an environment and captured and/or generated data about that environment. The vehicle(s) 122 can include some level of autonomy. For example, the log data 120 may be generated by Level 3 (L3) vehicles traversing the environment. Such vehicle are known to have autonomous functionality, but also include a passenger/driver to overtake control of the vehicle, if necessary. In other examples, the log data may be generated by Level 4 (L4) and/or Level 5 (L5) vehicles traversing the environment. In various examples, such log data may additionally or alternatively be generated based on executing simulations of the vehicle in a simulated environment.

Without limitation, and regardless of the type of the vehicle(s) 122, the log data 120 can include any sensor data generated by the vehicle(s) 122. For example, the vehicle(s) 122 may include one or more sensors for perceiving aspects of the vehicle(s) 122, such as a vehicle speed, vehicle acceleration, steering angle, and/or the like. Without limitation such sensors can include IMU sensors, encoders, accelerometers, tire pressure monitoring sensors, contact patch sensors, GPSS sensors, positioning sensors, and/or the like. The vehicle(s) 122 can also include one or more sensors for perceiving aspects of the environment, such as objects in the environment, weather conditions, and/or the like. Without limitation, examples of such sensors can include image-type sensors (e.g., cameras or imagers), range-type sensors (e.g., LiDAR sensors, radar sensors, sonar sensors, time-of-flight sensors), thermometers, microphones, and/or any other sensors configured to generate data associated with one or more attributes of the environment of the vehicle(s) 122. The log data 120 may also include data that is based at least in part on sensor data. For example, the log data can include perception data, generated by a perception component. Without limitation, the perception data can include information about an object (the object 108) such as, but not limited to, a representation of the object, e.g., a bounding box, pose information about the object, an estimated trajectory of the object, and/or the like. The log data can also, or alternatively, include planning data generated based at least in part on the sensor data. For example, planning data can include trajectories and/or control instructions generated by a planning component of one of the vehicle(s) 122. Any other information generated by the vehicle(s) 122 and/or component(s) associated with the vehicle(s) 122 may be included in the log data 120. In examples, the log data 120 may be stored as one or more data streams, e.g., with associated metadata including but not limited to classification data, time data (such as timestamps or the like), and/or any other data that may be used to identify portions of the log data.

The log data processing component 118 can include functionality to identify portions of the log data 120 associated with one (or more) of the scenarios generated by the scenario component 116. In the example of FIG. 1, and as detailed above, the example scenario 102 includes the vehicle 104 travelling in a first lane of a road with an object in an adjacent lane. In examples, the log data processing component 118 may be configured to determine the portions of the log data 120 that correspond to the scenario. For example, the log data processing component 118 can identify instances of the log data 120 in which one of the vehicle(s) 122 encountered a similar driving scenario, e.g., in which the vehicle(s) 122 was/were travelling on a two-lane road with an object in the adjacent lane.

FIG. 1 also shows that the computing device(s) 114 can include an exposure metric determination component 124, a severity metric determination component 126, a controllability metric determination component 128, and a safety goal determination component 130. These components are detailed further herein.

The exposure metric determination component 124 can include functionality to determine an exposure metric 132. The exposure metric 132 may be a representation of a frequency at which a vehicle is exposed to one or more driving conditions. In some examples, the exposure metric 132 may be a probability that a vehicle travelling in an environment will experience conditions associated with a given driving scenario. Continuing with the example of FIG. 1, the exposure metric 132 may be a representation of how frequently a vehicle being controlled in an environment encounters conditions corresponding to the example driving scenario 102. For instance, the exposure metric determination component 124 can receive information from the log data processing component 118 that identifies instances of the log data that correspond to the example driving scenario 102. The exposure metric determination component 124 can determine the exposure metric 132 as a percentage of those instances of the log data that correspond to the example driving scenario 102 relative to all of the log data. The exposure metric may be based on a number of instances of the driving scenario in the driving log or a time associated with the instances. In some examples, the exposure metric 132 may be associated with a percentage of a duration of the instances of the driving scenario to an overall driving duration in the driving logs.

In some examples, the exposure metric may correspond to exposure metrics associated with the ISO 26262 standard for functional safety of vehicles. For example, in the ISO 26262 framework, an exposure metric may be one of E0 (incredible), E1 (very low probability), E2 (low probability), E3 (medium probability), or E4 (high probability). In examples of this disclosure, the ISO 26262 framework may be used and an E0 exposure metric may correspond to an exposure of less than or equal to 0.01%, E1 may correspond to an exposure greater than 0.01%, E2 may correspond to an exposure of greater than 0.1%, E3 may correspond to an exposure of greater than 1.0%, and E4 may correspond to a probability of greater than 10%. Of course, this is for example only.

The severity metric determination component 126 includes functionality to determine a severity metric 134 associated with a driving scenario. In examples, the severity metric determination component 126 is configured to determine the severity metric 134 as a representation associated with an outcome of a driving scenario, like the example driving scenario. In some examples, the severity metric determination component 126 includes functionality to determine an outcome should the vehicle(s) 122 associated with an instance of the log data 120 perform according to the unintended trajectory 112. Thus, for example, for an instance determined by the log data processing component 118 to correspond to the example driving scenario 102, the severity metric determination component 126 can generate an outcome resulting from some system malfunction that causes the vehicle associated with the identified instance to travel along the unintended trajectory 112.

The severity metric determination component 126 can access the log data to determine specific attributes of the occurrence or instance of the example driving scenario 102. For example, the severity metric determination component 126 can determine, e.g., from the log data 120, at least one of a position of the vehicle 122 encountering the scenario, a position of the object, e.g., relative to the vehicle, a velocity of the vehicle, a velocity of the object, an acceleration or the vehicle, an acceleration of the object, a heading of the vehicle, a heading of the object, and/or other information about the vehicle and/or the object. The severity metric determination component 126 can also include functionality to determine, based at least in part on the attributes of the vehicle and/or object, a simulated or expected outcome, e.g., of the unintended trajectory 112. In examples, the severity metric determination component 126 can include functionality to simulate an outcome should an autonomous vehicle encounter the scenario from the driving logs and that autonomous vehicle has a malfunction that cause the autonomous vehicle to travel along the unintended trajectory 112. For example, the severity metric determination component 126 can include and/or access one or more models of the autonomous vehicle, such as one or more kinematic models, dynamic models, and/or the like. The severity metric determination component 126 can also, or alternatively, include and/or access one or more models associated with the encountered object, such as one or more kinematic models, dynamic models, and/or the like. As will be appreciated, a simulated outcome may be very different whether the object is a motorcycle or a tractor trailer.

Using the vehicle models and/or the object models, the severity metric determination component 126 can simulate the instance to determine one or more of a time to collision, a time of collision, should the vehicle and the object collide, a difference in velocity between the vehicle and the object, e.g., at the time of the collision, relative angles of the vehicle and the object at the collision, and/or other simulated data.

The severity metric 134 is based on the simulated data. For instance, and without limitation, the severity metric determination component 126 can score an outcome of the simulation. One example scoring scheme may include providing a score, e.g., a severity score, of from 0 to 6 for each simulation, as the severity metric 134. In this scoring scheme, 0 may represent no collision and the numbers 1-6 may indicate collisions of varying severity, e.g., a score of 1 may represent a minor injury (to a passenger in the vehicle and/or to a person associated with the object with which the vehicle collides), a score of 2 may represent a moderate injury, a score of 3 may represent a serious injury, a score of 4 may represent a severe injury, a score of 5 may represent a critical injury, and a score of 6 may represent a maximum injury. The severity scores may be based, at least in part, on a maximum abbreviated injury scale (MAIS) or other classification system to evaluate the relative and/or absolute severity of the collision and/or resultant severity or likelihood of different injury classes to individuals. In some instances, the severity metric 134 may be based at least in part on a probability of fatality, e.g., with a score of 1 representing a substantially 0% chance of fatality and a score of 6 representing a substantially 100% chance of fatality. In other examples, the severity metric 134 may be based at least in part on data corresponding to a distance travelled before a collision occurs, or distance travelled before a collision of a particular severity occurs. The severity metric 134 can also be based at least in part on a comparison against a benchmark for safety. In various examples, such simulations may be propagated despite no collision being present in the log data. As an example of which, a human monitoring an autonomous vehicle for potential issues may intervene prior to an issue occurring. However, the simulation may disregard the human input to evaluate the driving scenario as if no intervention occurred, thereby preserving safe operation of the vehicle while generating data to evaluate the safety of the underlying system.

In some examples, the severity metric may correspond to severity metrics associated with the ISO 26262 standard for functional safety of vehicles. For example, in the ISO 26262 framework, a severity metric may be one of S0 (no injuries), S1 (light and moderate injuries), S2 (sever and life-threatening injuries—survival probable), or S3 (life-threatening injuries—survival uncertain). In examples of this disclosure, the ISO 26262 framework may be used, with the various severity metrics being associated with a relative speed of the vehicle and the struck object. For example, when the struck object is vehicle, an S0 severity metric may correspond to a relative speed of less than or equal to 1.944 m/s, S1 may correspond to a relative speed greater than 1.944 m/s, S2 may correspond to a relative speed of greater than 10 m/s, and S3 may correspond to a relative speed of greater than 13.889 m/s. Of course, these relative speeds may be lower for other object types, such as pedestrians, bicyclists, and/or motorcyclists.

The controllability metric determination component 128 includes functionality to determine a controllability metric 136 associated with a driving scenario. In examples, the controllability metric determination component 128 is configured to determine the controllability metric 136 as a representation of a likelihood or capability of an object to avoid a hazardous event. Using the example driving scenario 102 of FIG. 1, the controllability metric 136 may be a representation of how likely the object 108 is to avoid a hazardous event or outcome (e.g., a collision or a collision above some threshold severity) in response to the vehicle 104 malfunctioning a travelling along the unintended trajectory 112. As will be appreciated, because aspects of this disclosure may be directed to autonomous vehicle control (e.g., L5 autonomous vehicle control), some examples herein assume that the autonomous vehicle can take no steps to avoid a collision should the vehicle malfunction. Accordingly, the controllability metric 136 may focus on the ability of the object 108 to mitigate a hazardous event.

The controllability metric determination component 128 can access the log data 120 and/or simulation data generated by the severity metric determination component 126, as described above, to determine the controllability metric 136. Without limitation, the controllability metric 136 may be based on a type of the object, e.g., whether the object 108 is a motorcycle, a pedestrian, an autonomous vehicle, a user-operated vehicle, and/or the like. The controllability metric determination component 128 can also or alternatively determine the controllability metric 136 based at least in part on a heading of the object relative to the malfunctioning of the vehicle, e.g., based on whether the object has full, partial, or no visibility of the malfunctioning vehicle. For example, the object may be more likely to avoid a serious collision when it has full visibility of the malfunctioning vehicle, for example, if the malfunctioning vehicle is an oncoming vehicle. In still further examples, the controllability metric determination component 128 can determine the controllability metric 136 based at least in part on a simulated or estimated time to collision between the vehicle and the object. For instance, the object may be more likely to avoid a serious collision with more time to react.

In some examples, the controllability metric may correspond to controllability metrics associated with the ISO 26262 standard for functional safety of vehicles. For example, in the ISO 26262 framework, a controllability metric may be one of C0 (controllable in general), C1 (simply controllable, e.g., 99% or more of objects are able to avoid harm), C2 (normally controllable, e.g., 90% or more of objects are able to avoid harm), or C3 (difficult to control or uncontrollable, e.g., less than 90% of objects are able to avoid harm). In examples of this disclosure, the ISO 26262 framework may be used, with the various controllability metrics being associated with a time to collision, e.g., a length of time before the vehicle and object are estimated to collide. For example, when the struck object is a vehicle in an oncoming lane, as in the example of FIG. 1, a C1 controllability metric may correspond to a time to collision of greater than 3.5 seconds, a C2 controllability metric may correspond to a time to collision of between 1.5 seconds and 3.5 seconds, and a C3 controllability metric may correspond to a time to collision of less than 1.5 seconds. Of course, these times to collision may be different depending on many factors, including but not limited to, object types, such as pedestrians, bicyclists, and/or motorcyclists, object orientation, e.g., whether the object has a clear field of view of the vehicle, and/or other factors.

The safety goal determination component 130 includes functionality to determine a safety goal 138 associated with an autonomous vehicle 140. For example, the safety goal determination component 130 can be configured to perform a hazard analysis and risk assessment, e.g., based on the exposure metric 132, the severity metric 134, and/or the controllability metric 136. In examples, the safety goal determination component 130 can receive one or more of the exposure metric 132, the severity metric 134, and/or the controllability metric 136, and/or the safety goal determination component 130 can determine the safety goal 138 based on one or more of the exposure metric 132, the severity metric 134, and/or the controllability metric 136. In one non-limiting example, the safety goal determination component 130 can receive, as an input, criteria for functioning of the autonomous vehicle 140. For example, the safety goal determination component 130 can receive criteria indicating that the autonomous vehicle 140 must avoid high-severity collisions in 99.99% of all driving instances.

The safety goal determination component 130 can conduct an assessment in accordance with the functional safety development process detailed by ISO 26262. In examples, the safety goal 138 may be a functional safety goal that dictates how an autonomous vehicle 140 performs in a given scenario. In examples, the safety goal 138 may have an associated integrity level. For example, the safety goal 138 may be based at least in part on the automotive safety integrity level (ASIL), as defined by the ISO 26262 standard. In the specific example of FIG. 1, e.g., in which the unintended trajectory 112 results from unintended (relative) lateral movement, the safety goal 138 can be represented as a lateral distance. For example, the lateral distance may be a minimum lateral distance for the autonomous vehicle 140 to maintain relative to an object, e.g., to mitigate damage from the unintended trajectory 112. In other examples, the safety goal 138 may be a plurality of lateral distances, e.g., each associated with a different ASIL rating.

In some instances, the safety goal 138 may be a requirement that the autonomous vehicle 140 perform with an ASIL-D grade in the example scenario 102. In instances in which the autonomous vehicle 140 does not perform according to the standard, e.g., using the techniques described herein, the techniques described herein can generate or update one or more control parameter(s) 144 for implementing at a vehicle control system 142. For example, should the autonomous vehicle 140 be travelling in a scenario that corresponds to the example driving scenario 102, the safety goal 138 may be implemented at the autonomous vehicle 140 to mitigate damage that would result from the autonomous vehicle 140 suffering a malfunction that results in the unintended trajectory 112.

As illustrated in FIG. 1, the safety goal 138 may be implemented at a vehicle control system 142 of the autonomous vehicle 140. For example, the vehicle control system 142 may be configured to maintain a minimum lateral distance from objects in certain scenarios, to not exceed a maximum speed in certain conditions, to maintain a minimum following distance from a leading object, and/or other criteria. In some examples the vehicle control system 142 can be configured to implement controls associated with the safety goals only when the autonomous vehicle 140 is encountering (or is likely to encounter) the example scenario. Returning to the example driving scenario 102 of FIG. 1, the vehicle control system 142 may have certain control parameters that are implemented when the autonomous vehicle 140 travelling on a two-lane road and an object is detected in an adjacent lane. On other road types and/or in the absence of objects, the vehicle control system 142 may be controlled according to other rules/parameters. Accordingly, aspects of this disclosure can include controlling the autonomous vehicle 140 according to different rules or configurations, based on the presence/absence of one or more conditions or scenarios.

The systems and techniques described herein may be useful to determine and implement autonomous vehicle controls to achieve and maintain safe operation of the autonomous vehicle. In the example of FIG. 1, in which the example driving scenario 102 is based on unintended lateral motion, the systems and techniques detailed herein can define a lateral safety margin, e.g., a lateral distance, that is not to be exceeded, e.g., with an associated integrity level. in the presence of a fault (e.g., from software systematic faults and/or random hardware failures) in any part of the trajectory execution system that may cause an unintended lateral deviation, the systems and techniques described herein allow to determine and demonstrate a safety strategy that prevents a lateral deviation greater than that specified in a requirement.

The systems and techniques described herein be used to test components or updates to components before rolling out those components/updates in a fleet of vehicles. For instance, performance of the vehicle control system 142 may be tested using techniques described herein to confirm that the vehicle control system 142 comports with the safety goal 138. Without limitation, aspects of the vehicle control system 142 and/or the autonomous vehicle 140 may be used by the severity metric determination component 126 to simulate outcomes to instances of a driving scenario.

Modifications to the foregoing also are contemplated. For instance, although the ISO 26262 is used as an example framework for performing some of the techniques described herein, other frameworks may be used. For instance, IEC 61508 describes another framework for determining safety risks, and aspects of this disclosure may be performed using that or other frameworks.

Figure 2:
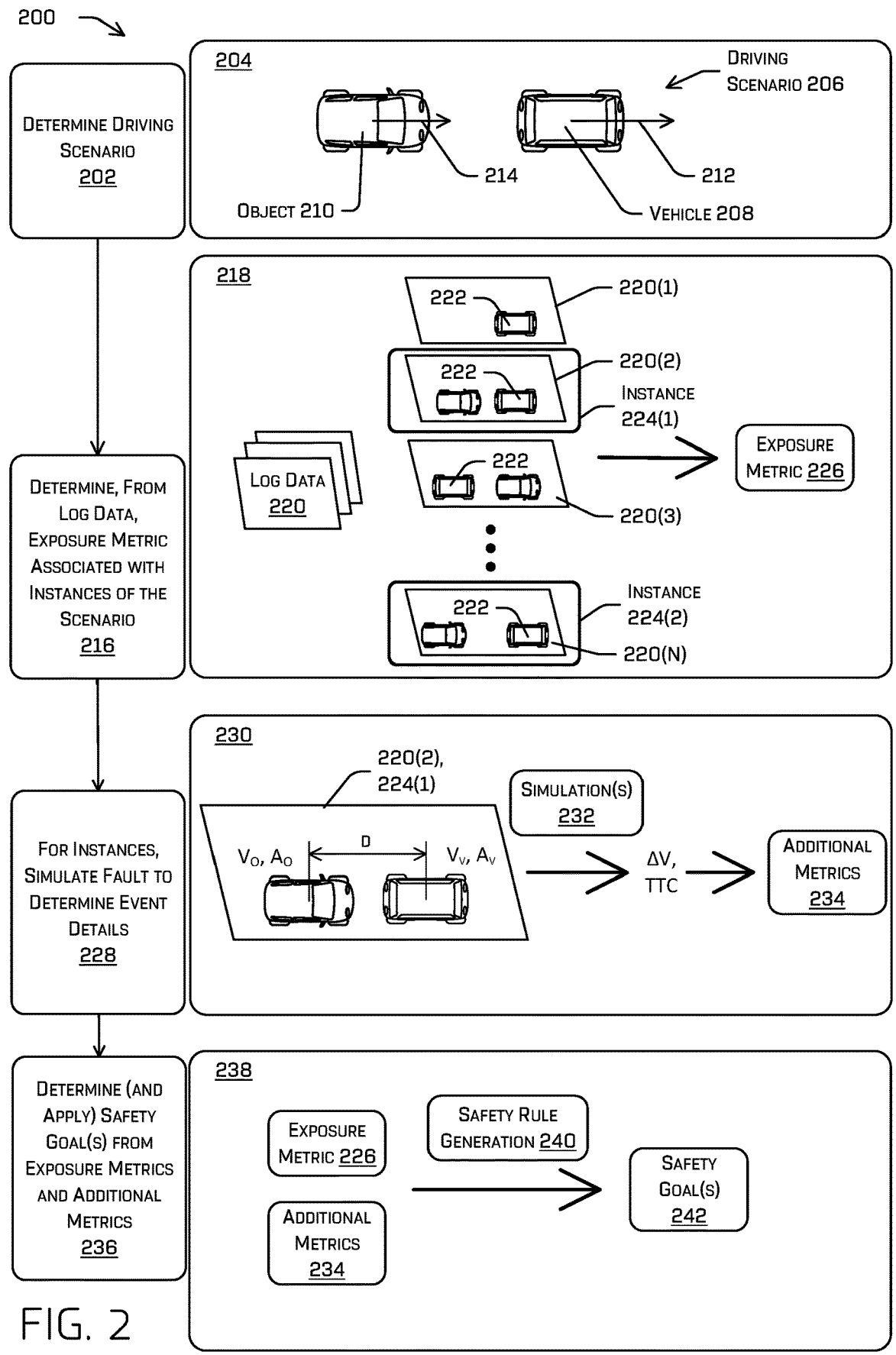
FIG. 2 includes graphical and textual flowcharts demonstrating example techniques for determining safety rules for a vehicle control system, in accordance with one or more implementations of the disclosure.
Figure 3:
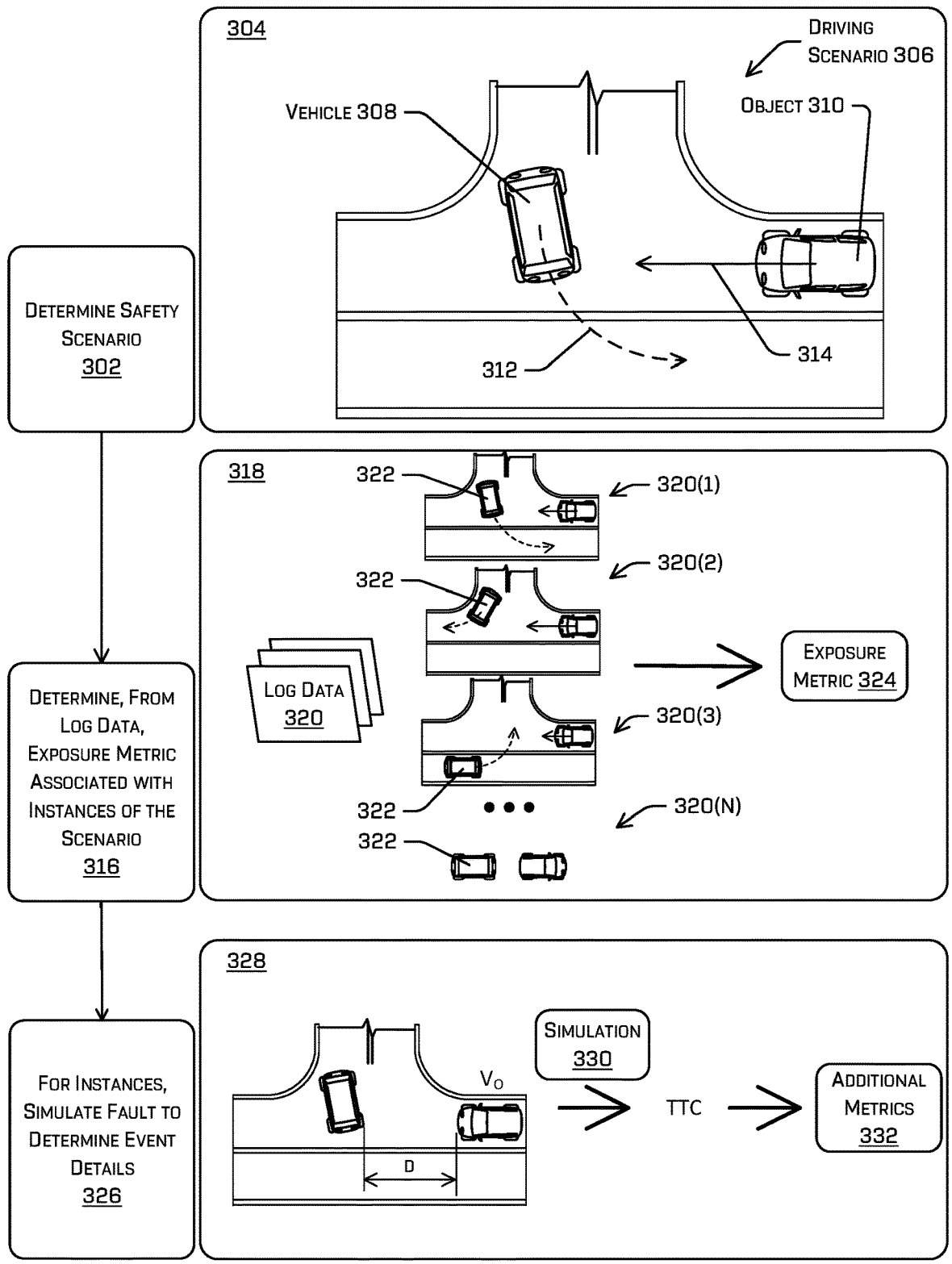
FIG. 3 includes graphical and textual flowcharts depicting additional example techniques for determining safety rules for a vehicle control system, in accordance with one or more implementations of the disclosure.

As detailed above, aspects of this disclosure include determining safety goals for implementation at a vehicle, e.g., an autonomous vehicle, to mitigate risk associated with unintended controlling of the autonomous vehicle. In the example of FIG. 1, the unintended controlling is associated with lateral motion of the autonomous vehicle, e.g., unintended lateral movement or loss of lateral control. Many additional driving scenarios also are contemplated. FIGS. 2 and 3 include pictorial and textual flow diagrams illustrating aspects of this disclosure in connection with different functional scenarios.

FIG. 2 includes textual and visual flowcharts associated with unintended deceleration resulting from malfunction of a component (e.g., a software or hardware component) of the autonomous vehicle. In more detail, FIG. 2 describes and illustrates a process 200 of determining safety goals for an autonomous vehicle to control the autonomous vehicle to mitigate damage resulting from unintended deceleration.

At an operation 202, the process 200 includes determining a driving scenario. As detailed above, the driving scenario may be associated with a malfunction of an autonomous vehicle, which malfunction may lead to unintended control of the autonomous vehicle. An example 204 accompanying the operation 202 illustrates a driving scenario 206 that may be used to evaluate vehicle control system response to unintended deceleration of an autonomous vehicle 208. In the illustrated scenario 206, the vehicle 208 is travelling in front of an object 210, e.g., a second vehicle. In the example 204, the vehicle 208 is travelling along a vehicle trajectory 212 and the object 210 is travelling along an object trajectory 214. For example, the vehicle 208 may be proceeding along a roadway with the object 210 following the vehicle 208. In this example, the vehicle 208 may experience an uncontrolled deceleration, e.g., the brakes of the vehicle 208 may be engaged to bring the vehicle 208 to an abrupt stop. As will be appreciated, as a result of the unexpected deceleration, the object 210 may rear-end the vehicle 208, which may harm passengers in the vehicle 208, harm passengers in the second vehicle, and/or cause damage to the vehicle and/or the object. Accordingly, it may be desirable to control an autonomous vehicle in a manner that, should the autonomous vehicle come to an abrupt stop, damage from a collision may be mitigated (or avoided entirely).

At an operation 216, the process 200 includes determining, from log data, an exposure metric associated with instances of the scenario. As detailed above, data logs can be generated from data associated with traversing through an environment. In some instances, the data logs can be generated from sensor data captured by sensors on a manual vehicle, a semi-autonomous vehicle (e.g., an L3 vehicle), a fully autonomous vehicle (e.g., an L5 vehicle). In additional or alternative examples, such log data may be fully or partially simulated. For example, log data may comprise actual data up until a point (e.g., until a human operator intervened) and be supplemented with simulated data.

As illustrated in an example 218 accompanying the operation 216, log data 220 can include a plurality of instances or frames, including a first frame of log data 220(1), a second frame of log data 220(2), a third frame of log data 220(3), up to and including an Nth frame of log data 220(N). Each of the frames of log data 220 may represent a scene at a moment or moments in time. For example, each of the frames of the log data may have a corresponding timestamp or some range of timestamps. In one non-limiting example, each of the frames of log data can represent $\frac{1}{10}$ of a second, $\frac{1}{100}$ of a second, one second, or some other time period. As will be appreciated, the data used to generate the log data, e.g., sensor data, perception data, and/or the like, may not be generated at the same time. For example, certain sensor types may have different cycle or frame rates and/or sensors may not be synchronized with each other. Accordingly, in examples, attributes in a given frame of the log data can be extrapolated, interpolated, or otherwise projected or estimated to a common point in time, e.g., a specific timestamp.

Each of the frames of log data 220 are illustrated as a representation of a scene involving a vehicle 222 (e.g., corresponding to the vehicle 208 and with which a frame of the log data 220 is associated). That is, the vehicle 222 is a representation of one of the vehicle(s) 122 that generates the particular frame of log data. Although simplified for illustration in FIG. 2, each of the frames of log data 220 can include data about the vehicle 222 and/or about any other objects or conditions associated with the environment corresponding to the log data. For example, each of the frames of the log data 220 can include data about the associated vehicle, including but not limited to a velocity of the vehicle 222, an acceleration of the vehicle 222, a position of the vehicle 222, a heading of the vehicle 222, steering data, braking data, tire pressure data, and/or any other data that may be sensed or otherwise generated with respect to the vehicle. Each of the frames of log data 220 can also include data about any other objects or conditions associated with an environment represented by the log data. For example, the second frame of the log data 220(2), the third frame of the log data 220(3), and the Nth frame of the log data 220(N) includes an object, e.g., a second vehicle, in addition to the vehicle 222. The log data 220 can include information about the second vehicle, including but not limited to, a velocity of the second vehicle, an acceleration of the second vehicle, a heading of the second vehicle, a position of the second vehicle, and/or any other information. When additional vehicles and/or other dynamic or potentially-dynamic objects, such as pedestrians, bicyclists, and/or the like are present in the environment, the log data 220 may also contain information about such objects. The log data 220 can also include information about static components in the environment, e.g., information about the driving surface, layout of the road, positions and/or presence of buildings, road signs, and/or the like, and/or any other information.

The operation 216 includes determining the portions of the log data 220, e.g., frames of the log data that correspond to instances of the driving scenario 206 determined at the operation 202. As illustrated in the example 218, the second frame of the log data 220(2) is identified as a first instance 224(1) of the driving scenario 206 in the log data 220 and the Nth frame of the log data 220(N) is identified as a second instance 224(2) of the driving scenario 206 in the log data 220. Specifically, in both of the instances 224, the vehicle 222 is being followed by another object, e.g., another vehicle, and a sudden deceleration (according to the driving scenario 206) could result in a hazardous event. In comparison, in the first frame of the log data 220(1), there is no additional vehicle or object to be effected should the vehicle 222 decelerate unexpectedly. Similarly, in the third frame of the log data 220(3), the vehicle 222 is trailing the second vehicle (assuming left-to-right movement), such that a sudden deceleration by the vehicle 222 would not impact the second vehicle. Of course, these frames of log data 220 and instances 224 are for example only and simplified for clear illustration. In further examples, exposure metrics may generally correspond to a fraction of the total amount of driving associated with one or more internal and/or external factors. As a non-limiting example of which, the exposure metric may be associated with the percentage of log data in which a vehicle is navigating proximate a pedestrian in adverse weather conditions.

As also shown in the example 218, an exposure metric 226 is generated from the instances 224 and the log data 220. The exposure metric 226 may be the exposure metric 132 discussed above. In a simple example, the exposure metric 226 may be a percentage of the instances 224 to all frames of the log data 220. In a simple example in which N=4, the exposure metric would be 50% as of the four frames, two were associated with an instance. When using the ISO 26262 exposure metric, as discussed above, the exposure metric may correspond to an E4 (high probability). Of course, in practice N is likely equal to thousands or more frames of log data. In fact, each interaction of the vehicle 222 with the object may result in a number of frames of the log data 220, e.g., each corresponding to a different timestamp.

In examples, the exposure metric 226 can include more than a single exposure metric and/or can be differently determined. For instance, in at least some examples a 2D histogram of the instances can be generated to determine the exposure metric 226. The operation 216 can include generating a 2D histogram of the speed of the vehicle 222, e.g., a longitudinal speed associated with $V_v$, and the distance D between the vehicle 222 and the object. In the histogram, the speeds and/or distances can be "binned" or otherwise grouped to determine exposures for discreet speed and distance ranges. The operation 216 can further include plotting a cumulative exposure using the distances and the exposure percentages, and computing an exposure matrix that associates exposure metrics, e.g., E1, E2, E3, E4 in the ISO 26262 framework, with following distances and vehicle speed. In the matrix, E1 will be associated with a relative shorter distance for each velocity range and E4 will be associated with relatively larger distances for each velocity range. In at least some examples, the exposure metric can include following distances at which each exposure threshold (e.g., E1 to E2, which may be 0.1%) is crossed for each velocity bin.

At an operation 228, the process 200 also includes, for the instances, simulating a fault to determine event details. Conceptually, the operation 228 can include simulating the unintended controlling (e.g., the rapid deceleration in this instance) for each of the instances 224 that correspond to the scenario 206 and determining information associated with outcomes of such simulation(s). An example 230 includes the second frame of the log data 220(2), which corresponds to the first instance 224(1) of the scenario 206, with additional detail. Specifically, the example 230 shows that the vehicle has an associated acceleration $A_v$ and an associated velocity $V_v$, known from the log data 220. Similarly, the object, e.g., the second vehicle, has an object acceleration $A_O$ and an object velocity $V_O$, also known from the log data 220. Moreover, because the positions of the vehicle and object are known, a longitudinal distance D between the vehicle and the object also is known (or can be determined) from the log data. As will be appreciated, when other scenarios are considered, e.g., determined at the operation 202, other portions of the log data may be used at the operation 228. For instance, if the example driving scenario 102 is determined at the operation 202, a lateral distance between the vehicle and the object, in addition to, or instead of a longitudinal distance D. Moreover, steering angles, maximum steering angles, road curvature, and/or other data may be useful to simulate the example driving scenario 102.

As shown in the example 230, simulation(s) 232 is/are performed to simulate an outcome of the (hypothetical) sudden deceleration corresponding to the driving scenario 206. In examples, the simulation(s) 232 can include a fault simulation based at least in part on a model of a hypothetical autonomous vehicle, e.g., the autonomous vehicle 140, taking the place of the measured properties of the vehicle 222. For instance, the simulation(s) 232 can be based at least in part on a kinematic model of the hypothetical vehicle. In examples, the simulation(s) 232 can be a kinematic fault injection. Continuing the example described above, the simulation(s) 232 can include a plurality of simulations, each being based at least in part on one or more of an initial velocity of the vehicle, e.g., $V_v$, the following distance (which may be based at least in part on the E1-E4 exposures discussed above, a magnitude of the "fault" (in this example the unintended deceleration, and/or a fault tolerance time interval. Without limitation, simulations may be run for each combination of the foregoing parameters. The simulations can also be based on one or more attributes (or estimated attributes) of the object. Such attributes can include, but are not limited to an initial position of the object, an initial velocity of the object, an initial acceleration of the object, an estimated object reaction time (e.g., a time to perceive that the vehicle is unexpectedly decelerating), an estimated object reaction deceleration (e.g., in response to perceiving the unexpectedly decelerating vehicle), and/or other parameters. As will be appreciated many of these attributes of the object will vary based on the object type and at least some of the attributes may be based at least in part on models, heuristics, and/or the like.

The simulation(s) 232 are configured to determine outcomes of the (hypothetical) malfunction. In examples, the simulation(s) may determine parameters including a relative velocity of the hypothetical vehicle and the object at a collision event and/or a time to collision, e.g., a time from commencement of the unintended controlling to the collision event. In examples, other attributes of the fault can also be determined, including but not limited to an angle of impact associated with the collision, and/or other information.

As also shown in the example 230, the parameters of the simulation(s) 232 can be used to determine one or more additional metrics 234. For example, the additional metrics 234 can include one or more severity metrics 134. In the example of FIG. 2, the severity of the collision may be based on relative velocity of the object and the vehicle. Using the ISO 26262 framework a severity metric of S1 may correspond to a relative velocity of greater than 1.944 m/s, a severity metric of S2 may correspond to a relative velocity of greater than 10 m/s and a severity metric of S3 may correspond to a relative velocity of greater than 14.583 m/s. These values may correspond to the object being a vehicle, with other, e.g., lower relative velocities, being assigned when the object is a pedestrian, bicyclist, or a motorcyclist.

The additional metrics can also (or alternatively) include a controllability metric, like the controllability metric 136 detailed above. The evaluation of controllability may be an estimate of the probability that someone is able to gain sufficient control of the hazardous event, such that they are able to avoid the specific harm. In the example of FIG. 2, an object reaction may be assumed in the simulation(s) 232. Accordingly, for the scenario 206, under the ISO 26262 framework, a controllability of C3 may be assumed for all scenarios.

At an operation 236, the process 200 includes determining (and applying) safety goal(s) from the exposure metrics and the additional metrics. An example 238 accompanying the operation 236 schematically illustrates a safety goal generation component 240, which may be the safety goal determination component 130 discussed above, generating one or more safety goals 242 from the exposure metrics 226 and the additional metrics 234. In examples, the operation 236 can include generating a safety rating, e.g., an ASIL rating for each simulation, e.g., based on the associated exposure metric, severity metric, and controllability metric. In examples, the safety goal generation component 240 can determine, for each combination of fault magnitude and FTTI (fault tolerant time interval), a highest ASIL rating among all scenarios, agents, exposures, and vehicle initial velocities. In some examples, the operation 236 can include generating an overall ASIL plot for the driving environment.

The safety goal(s) 242 may be determined based at least in part on the ASIL plot. For instance, for each fault magnitude, the minimum FTTI for any given ASIL may be the driving requirement. For example, the operation 236 can determine, based on the simulation(s) 232 and the metrics, a maximum duration of an unintended deceleration (e.g., in seconds) for each magnitude (or range of magnitudes). In one non-limiting example, a desirable ASIL A rating may be assured if the unintended deceleration is below a certain duration for any magnitude of the unintended deceleration. Thus, for example, to maintain an ASIL A safety goal, a duration of the unintended deceleration may be below 1.6 s (FTTI—fault duration) when the magnitude of the unintended deceleration is between −4.5 m/s² and −5.0 m/s² (fault magnitude). In other examples, the highest integrity level found for any combination of fault magnitude and FTTI may result in the safety goal 242.

As will be appreciated from the forgoing, the process 200 may be implemented to determine the safety goal(s) 242 for the driving scenario 206. With the safety goal(s) 242 determined, e.g., corresponding to the fault duration and fault magnitudes (for instance, for a desired ASIL rating), one or more vehicle control parameters, like the vehicle control parameters 144, may be determined and implemented to configure an autonomous vehicle to navigate the environment. For example, the safety goal(s) 242 can be used to determine a driving requirement, such as the minimum FTTI for each fault magnitude and/or driving scenario. In examples, vehicle control parameters may include a maximum speed to maintain based on the perceived distance of a following vehicle. In other instances, one or more vehicle components may be configured to ensure that the maximum deceleration of a vehicle is maintained only for the determined duration, e.g., regardless of the fault type. Other vehicle control parameters also are contemplated.

As noted above, the process 200 is associated with the example driving scenario 206. The process 200 may also be applied to the example driving scenario 102. In such examples, the safety goal(s) 242 may inform vehicle control parameters such as lateral distance to maintain relative to an object and/or relative velocities to maintain, e.g., to ensure an ASIL-based safety goal. FIG. 3 is another example of implementing the systems and techniques described herein.

FIG. 3 describes and illustrates a process 300 for determining metrics associated with safety goals for an autonomous vehicle that suffers a malfunction that causes the autonomous vehicle to lose acceleration functioning.

At an operation 302, the process 300 include determining a driving scenario. As detailed above, the driving scenario may be associated with a malfunction of an autonomous vehicle, which malfunction may lead to unintended control of the autonomous vehicle. An example 304 accompanying the operation 302 illustrates a driving scenario 306 that may be used to evaluate vehicle control system response to loss of acceleration of an autonomous vehicle 308. In the illustrated scenario 306, the vehicle 308 has entered an intersection, e.g., to cross traffic, and an object 210 is oncoming. In the example 304, the vehicle 308 is travelling along a vehicle trajectory 312 that will carry the vehicle across the oncoming object 310 and into a lane adjacent the lane in which the object 310 is travelling. The object 210 is travelling along an object trajectory 314, e.g., in a lane of the road. In this example scenario 306, the vehicle 308 may experience a loss of acceleration function, e.g., one or more motors of the vehicle 308 may cease to function, brakes of the vehicle 308 may seized, preventing movement of the vehicle 308, or the like. As will be appreciated, as a result of the loss of acceleration, the vehicle 308 may be unable to clear the path of the object 310, and the object 310 may strike the vehicle 308, which may harm passengers in the vehicle 308, harm passengers in the second vehicle, and/or cause damage to the vehicle and/or the object. Accordingly, it may be desirable to control an autonomous vehicle in a manner that, should the autonomous vehicle lose acceleration functionality, damage from a collision may be mitigated (or avoided entirely).

At an operation 316, the process 300 includes determining, from log data, an exposure metric associated with instances of the scenario. As detailed above, data logs can be generated from data associated with traversing through an environment. In some instances, the data logs can be generated from sensor data captured by sensors on a manual vehicle, a semi-autonomous vehicle (e.g., an L3 vehicle), a fully autonomous vehicle (e.g., an L5 vehicle), and/or any other vehicle.

As illustrated in an example 318 accompanying the operation 316, log data 320, like the log data 220, can include a plurality of instances or frames, including a first frame of log data 320(1), a second frame of log data 320(2), a third frame of log data 320(3), up to and including an Nth frame of log data 320(N).

Each of the frames of log data 320 are illustrated as a representation of a scene involving a vehicle 322 (e.g., corresponding to the vehicle 308 and with which a frame of the log data 320 is associated). That is, the vehicle 322 is a representation of one of the vehicle(s) 122 that generates the particular frame of log data. Although simplified for illustration in FIG. 3, each of the frames of log data 320 can include or have associated therewith data about the vehicle 322 and/or about any other objects or conditions associated with the environment corresponding to the log data. For example, each of the frames of the log data 320 can include data about the associated vehicle, including but not limited to a velocity of the vehicle 322, an acceleration of the vehicle 322, a position of the vehicle 322, a heading of the vehicle 322, steering data, braking data, tire pressure data, and/or any other data that may be sensed or otherwise generated with respect to the vehicle. Each of the frames of log data 320 can also include data about any other objects or conditions associated with an environment represented by the log data. For example, the frame of the log data 320 also include an object, e.g., a second vehicle, in addition to the vehicle 322. The log data 320 can include information about the second vehicle, including but not limited to, a velocity of the second vehicle, an acceleration of the second vehicle, a heading of the second vehicle, a position of the second vehicle, and/or any other information. When additional vehicles and/or other dynamic or potentially-dynamic objects, such as pedestrians, bicyclists, and/or the like are present in the environment, the log data 320 may also contain information about such objects. The log data 320 can also include information about static components in the environment, e.g., information about the driving surface, layout of the road, positions and/or presence of buildings, road signs, and/or the like, and/or any other information.

The operation 316 includes determining the portions of the log data 320, e.g., frames of the log data 320, that correspond to instances of the driving scenario 306 determined at the operation 302. As illustrated in the example 318, the first frame of the log data 320(1), the second frame of the log data 320(2), and the third frame of the log data 220(3) are instances of the driving scenario 206 in the log data 220, e.g., because the vehicle 322 is entering an intersection in a manner that loss of acceleration could leave the vehicle in the path of an oncoming object. In contrast, the Nth frame of the log data 220(N) is not an instance of the scenario, because, assuming the vehicle 322 and the object are travelling from left to right in that frame, a loss of acceleration of the vehicle 322 would not impact the travel of the object (the object would pull away from the stopped vehicle 322). Of course, these frames of log data 320 and instances 224 are for example only and simplified for clear illustration.

As also shown in the example 318, an exposure metric 324 is generated from the identified instances and the log data 220. The exposure metric 324 may be the exposure metric 132, 226 discussed above. For example, the exposure metric may be based on the probability that relevant environmental factors that contribute to the occurrence of a hazardous event are present. In a simple example, the exposure metric 324 may be based at least in part on a percentage of the instances of the scenario to all frames of the log data 320. In other examples, the exposure metric 324 may be based at least in part on a duration of the instances of the driving scenario 306 as a percentage of the overall driving duration of the log data 320. Moreover, the exposure metric can be based at least in part on other factors or data. For instance, the instances can be grouped or otherwise defined. For example, first instances may be those in which the velocity of the object is equal to or above some first threshold and second instances may be those in which the velocity of the object is below that first threshold. Similarly, first instances may be those in which the distance between the object and the vehicle is equal to or above some second threshold and second instances are those in which the distance is below the second threshold.

At an operation 326, the process 300 also includes, for the instances, simulating a fault to determine event details. Conceptually, the operation 326 can include simulating the unintended controlling (e.g., the loss of acceleration in the example of FIG. 3) for each of the instances that correspond to the scenario 306 and determining information associated with outcomes of such simulation(s). An example 328 accompanying the operation 326 includes the first frame of the log data 220(2) with additional detail. Specifically, the example 328 shows that the object has an object velocity $V_O$, known from the log data 320. Moreover, because the positions of the vehicle and object are known, a longitudinal distance D between the vehicle and the object also is known (or can be determined) from the log data 320. In this scenario, because the vehicle is assumed to have lost acceleration functionality, the velocity of the vehicle is assumed to be zero.

As shown in the example 328, simulation(s) 330 is/are performed to simulate an outcome of the (hypothetical) loss of acceleration corresponding to the driving scenario 306. In examples, the simulation(s) 330 may include a simple calculation that determines a time to collision (e.g., $D/V_O$), identifies the original velocity $V_O$, and/or determines a velocity of the vehicle at the hypothetical impact. In examples, other attributes resulting from the unintended controlling (loss of acceleration) can also be determined, including but not limited to an angle of impact associated with the collision and/or other information.

As also shown in the example 328, the parameters of the simulation(s) 330 can be used to determine one or more additional metrics 332. For example, the additional metrics 332 can include one or more severity metrics 134. In the example of FIG. 3, the severity of the collision may be based on relative velocity of the object and the vehicle, which may be assumed to be the velocity of the object. Using the ISO 26262 framework a severity metric of S1 may correspond to a relative velocity of greater than 1.667 m/s, a severity metric of S2 may correspond to a relative velocity of greater than 5.278 m/s, and a severity metric of S3 may correspond to a relative velocity of greater than 7.778 m/s. These values may correspond to the object being a vehicle, and the collision being a side-impact collision. Other, e.g., lower relative velocities, may be assigned when the object is a pedestrian, bicyclist, motorcyclist, or other object type.

The additional metrics can also (or alternatively) include a controllability metric, like the controllability metric 136 detailed above. The evaluation of controllability may be an estimate of the probability that someone is able to gain sufficient control of the hazardous event, such that they are able to avoid the specific harm. In the example of FIG. 3, because the "stalled" vehicle is in the line of sight of the object, an object reaction time may be determined based on a time to collision, e.g., determined during the simulation(s) 330 and based on the log data 320. For instance, for the scenario 306, under the ISO 26262 framework, a controllability metric of C1 may be assumed when the time to collision is greater than 3.5 seconds, a controllability metric of C2 may be assumed when the time to collision is between 1.5 seconds and 3.5 seconds, and a controllability metric of C3 may be assumed when the time to collision is less than 1.5 seconds.

Although not illustrated in FIG. 3, the process 300 can also include determining (and applying) safety goal(s) from the exposure metrics and the additional metrics. For example, the process 300 can include the operation 236 from FIG. 2, in which a safety goal generation component, which may be the safety goal determination component 130 discussed above, generates one or more safety goals from the exposure metrics 326 and the additional metrics 332. In examples, the operation 236 can include generating a safety rating, e.g., an ASIL rating for each simulation, e.g., based on the associated exposure metric, severity metric, and controllability metric. An example table summarizing Exposure, Severity, Controllability, and ASIL ratings for scenarios involving vehicles as the object is shown here:

| Object | Controllability | Exposure (Rate) | Severity (Highest Relative Speed) | ASIL |
|---|---|---|---|---|
| Vehicle | C3 | E0 (0.0014%) | S3 (>7.778 m/s) | QM |
| Vehicle | C2 | E1 (0.03%) | S3 (>7.778 m/s) | QM |

As will be appreciated from the table, the final ASIL rating for the scenario 306 is ASIL QM, wherein QM denotes quality management, indicating that all assessed risks are tolerable. Accordingly, safety assurance controls may not be necessary, instead standard quality management process may be sufficient for development relative to the scenario 306. Thus, the vehicle may be controlled according to nominal operating scenarios in the instance of an unintended loss of acceleration.

Accordingly, the systems and techniques described herein can be used to evaluate safety outcomes using log data for an environment, determine safety goals for autonomous vehicles travelling in that environment, determining control parameters for the autonomous vehicle to travel in the area in conformity with the safety goal(s), and/or implement such control parameters. The safety goal(s) and/or the control parameters are based at least in part on log data generated by a fleet of vehicles and/or simulations generated using the log data. By determining metrics, e.g., exposure metrics, severity metrics, and/or controllability metrics, the techniques described herein may provide improved safety outcomes over previous techniques that relied heavily on engineering judgment, instead of log data and simulations. In some examples, the safety goal(s) can be implemented on the vehicle while the vehicle is travelling, e.g., by configuring the vehicle to perform in a first configuration and/or according to first control parameters when a specific scenario is encountered. Also in examples, the systems and techniques described herein can be used to adjust systems of the vehicle to improve performance of the vehicle, e.g., to comport with one or more safety goals. As a non-limiting example of which, control (e.g., code) may be reviewed with respect to the safety goals to ensure that a certain minimum safety level is met over a variety of instances prior to pushing the controls (e.g., code) to vehicles in a fleet of vehicles.

Figure 4:
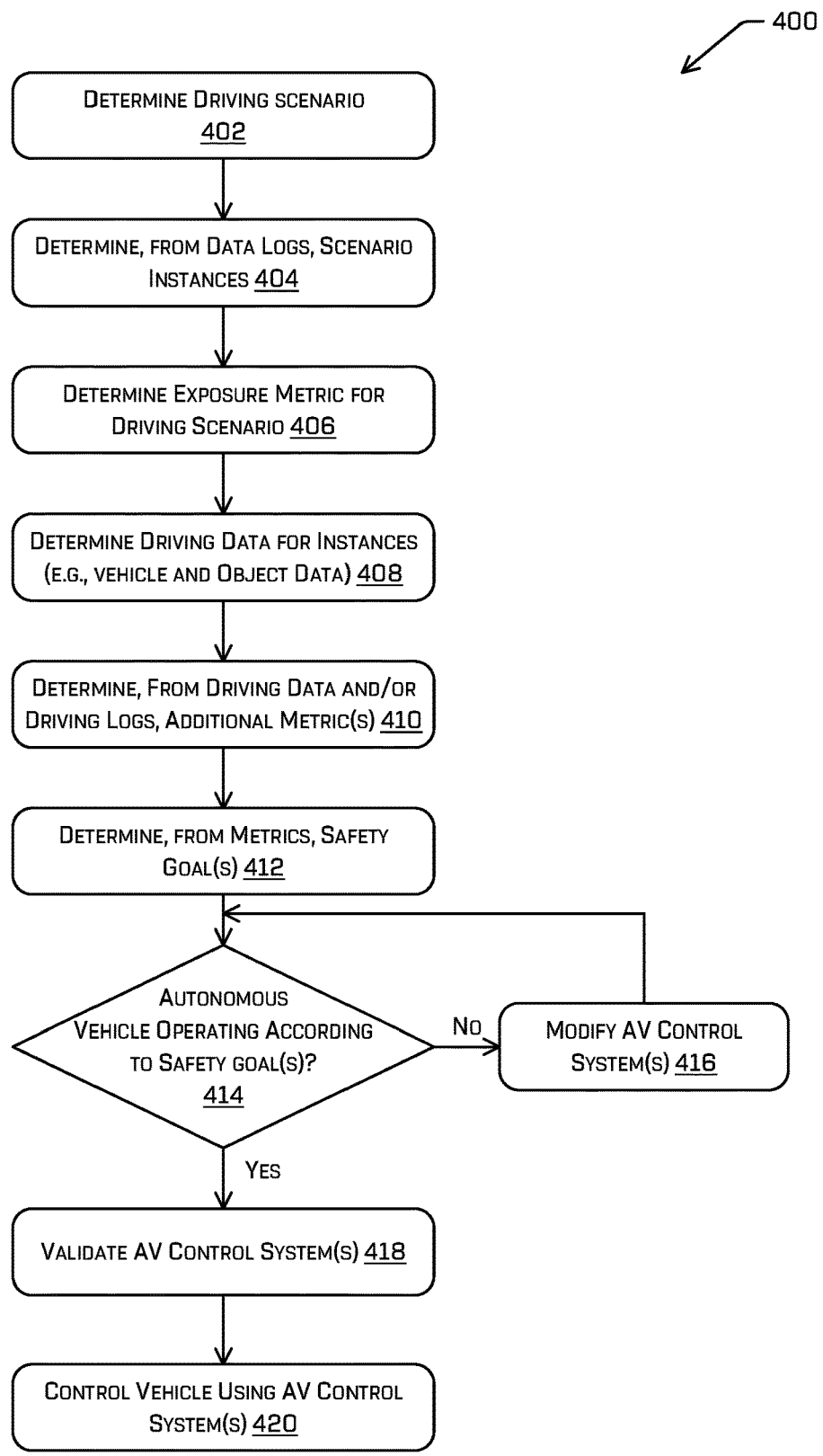
FIG. 4 is a flow diagram illustrating an example process for generating safety goals for vehicle control systems and monitoring vehicle operation to confirm conformance with the safety goals, in accordance with one or more implementations of the disclosure.

FIG. 4 illustrates a process 400 for controlling an autonomous vehicle to generating severity scores for simulations of collisions between simulated objects in a simulated environment. The process 400 is illustrated as a logical flow graph, each operation of which represents a sequence of operations that may be implemented in hardware, software, or a combination thereof. In the context of software, the operations represent computer-executable instructions stored on one or more computer-readable storage media, e.g., non-transitory computer readable storage media, that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, the process 400 may be performed by one more processors of one or more computing devices, such as any one or more of the computing device(s) 114, 504, 530 and/or other computing devices described herein. The process 400 may be embodied in computer-readable instructions stored on a non-transitory computer readable medium that are executable by one or more processors to perform the process 400.

At an operation 402, the process 400 includes determining a driving scenario. For example, the operation 402 may be one or more of the operations 202, 302. The driving scenario may be one or more of the scenarios 102, 206, 306 detailed herein.

At an operation 404, the process 400 includes determining, from data logs, scenario instances. As detailed herein, data logs may be generated by one or more vehicles, e.g., a fleet of vehicle, driving in an environment. The data logs can include information about the driving vehicle and/or about objects in the environment. The log data can also include associated information, e.g., including metadata that may identify attributes of the road on which the vehicle is travelling (such as lane configuration information, traffic control devices, and/or the like). The operation 404 can including mining the log data to identify those instances that correspond to the driving scenario identified at the operation 402.

At an operation 406, the process 400 includes determining an exposure metric for the scenario. For examples, the process 400 can include determining a ratio of the instances in the log data to all log data, e.g., based on a number of frames, a duration time, and/or the like. Moreover, multiple exposure metrics may be determined for each scenario, e.g., by determining sub-scenarios and/or the like. For example, the operation 406 may correspond to the operation 216 and/or the operation 316 discussed above.

At an operation 408, the process 400 includes determining driving data for the instances. For example, the process 400 can include simulating one or more of the instances to determine vehicle data and/or object data. The simulations can include fault injection simulations, kinematic model simulations, and/or the like. For example, the operation 408 can include running the simulation(s) 232, 330.

At an operation 410, the process 400 includes determining, from the driving data and/or the log data, additional metrics. The additional metrics may be the additional metrics 234 and/or the additional metrics 332 described herein. The additional metrics may include severity metrics and/or controllability metrics, as described herein. In examples, the operation 410 may correspond to aspects of the operations 228, 326

At an operation 412, the process 400 includes determining, from the metrics one or more safety goals. For example, the operation 412 can include determining one or more safety goal(s) based at least in part on exposure metrics, severity metrics, and/or controllability metrics. As above, such safety goals may comprise, for example, maximum or minimum accelerations, maximum or minimum velocities, steering angles, steering rates, and/or any other control/constraint on the vehicle. In examples, the safety goal(s) may be used to determine an ASIL rating, which may correspond to an acceptable ASIL rating. In some examples, the safety goal may be associated with a specific ASIL rating, e.g., such that the goal of the autonomous vehicle is to operate in accordance with the ASIL rating.

At an operation 414 the process 400 includes determining whether an autonomous vehicle and/or vehicle controller is operating according to the safety goal(s). For example, the operation 414 may include determining whether an ASIL rating determined in conjunction with the operation 412 is sufficient or otherwise acceptable. For example, the operation 414 may determine that a C rating is required, but the outcomes determined in accordance with the safety goal determination is only a B rating.

If, at the operation 414, it is determined that the autonomous vehicle is not operating in accordance with the safety goal(s) (no at 414), the process 400 includes, at an operation 416, modifying the autonomous vehicle control system(s). For example, and as detailed above, the modifying the AV control system(s) can include implementing limitations, rules, and/or restrictions, including but not limited to limiting a speed of the autonomous vehicle in certain scenarios, maintaining a minimum distance between the autonomous vehicle and objects around the autonomous vehicle, and/or the like. The operation 416 can also include modifying, including updating, troubleshooting, replacing, and/or the like, one or more aspects of the underperforming autonomous vehicle control system(s).

Alternatively, if, at the operation 414 it is determined that the autonomous vehicle is operating in accordance with the safety goal(s) (yes at 414), the process 400 includes, at an operation 418, validating the autonomous vehicle control system(s). For example, the autonomous vehicle control system(s) may be validated for use in an autonomous vehicle and such control systems may be transmitted to one or more vehicles in a fleet of autonomous vehicles for controlling in an environment.

At an operation 420, the process 400 may include controlling an autonomous vehicle using the autonomous vehicle control system(s). Specifically, once validated at the operation 418 the autonomous vehicle control system(s) may be integrated into an autonomous vehicle to control aspects of the autonomous vehicle in a real world environment. Specifically, the autonomous vehicle may be configured to operate in a real-world environment corresponding to the environment from which the log data was collected by running the control system(s) verified using the process 400. In some examples the control system may be used by an autonomous vehicle after additional testing or the like. In additional or alternate examples, the autonomous vehicle may determine a driving scenario encountered and respond by modifying the controls in accordance with the safety goals for safely navigating in response to the instance.

Figure 5:
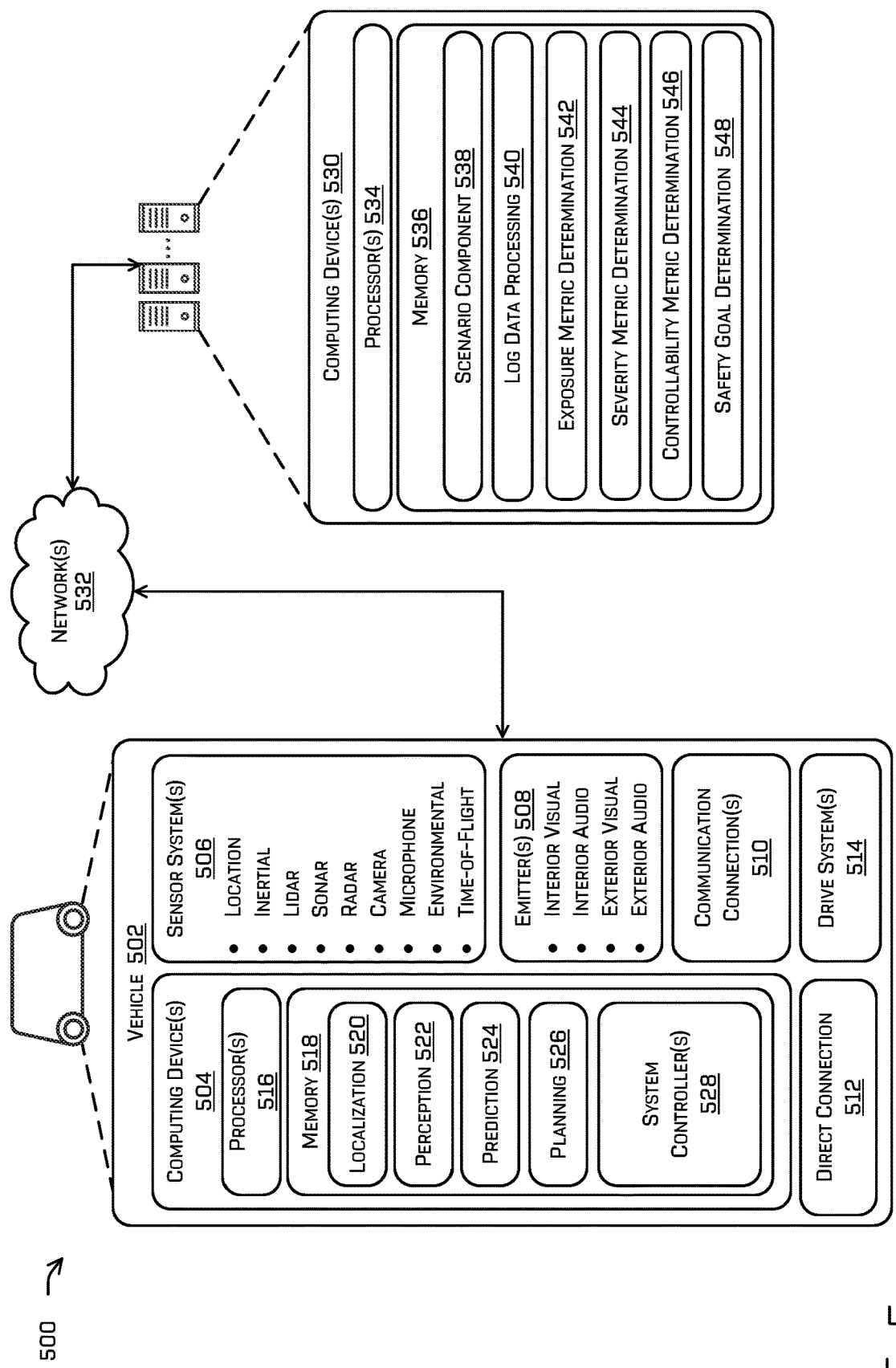
FIG. 5 is a block diagram illustrating an example system, including a vehicle and a separate computing system, for implementing various techniques described herein.

FIG. 5 depicts a block diagram of an example computing environment 500 for implementing the techniques discussed herein. The example computing environment 500 may be used to implement the driving simulation systems and techniques described herein. The computing environment 500 includes a vehicle 502 and one or more computing device(s) 530 configured to generate, execute, and evaluate driving simulations. The vehicle 502 may include various software-based and/or hardware-based components of an autonomous vehicle, and may be used to control autonomous vehicles traversing through physical environments and/or simulated vehicles operating within log-based driving simulations. The vehicle 502 may be similar or identical to any or all of the real and/or simulated vehicles or vehicle controllers described herein. The computing device(s) may be similar or identical to the computing device(s) 114 described above in reference to FIG. 1. In some examples, the vehicle 502 may correspond to a vehicle traversing a physical environment, capturing and storing log data which may be provided to a simulation system and used to generate a simulations.

The vehicle 502 can include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514.

The sensor system(s) 506 can be configured to capture sensor data associated with an environment. The sensor system(s) 506 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the computing device(s) 504.

The emitter(s) 508 are configured to emit light and/or sound. The emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The communication connection(s) 510 enable communication between the vehicle 502 and one or more other local or remote computing device(s) (e.g., the computing device(s) 530, a remote teleoperations computing device) or remote services. For instance, the communication connection(s) 510 can facilitate communication with other local computing device(s) on the vehicle 502 and/or the drive system(s) 514. Also, the communication connection(s) 510 can allow the vehicle 502 to communicate with other nearby computing device(s) (e.g., other nearby vehicles, traffic signals, etc.).

The communications connection(s) 510 can include physical and/or logical interfaces for connecting the computing device(s) 504 to another computing device or one or more network(s) 532 (e.g., the Internet). For example, the communication connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 510 may comprise the one or more modems as described in detail above.

In at least one example, the vehicle 502 can include the drive system(s) 514. In some examples, the vehicle 502 can have a single drive system. In at least one example, if the vehicle 502 includes more than one of the drive system(s) 514, e.g., with a single one of the drive system(s) 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., the sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more modules to perform various functionalities of the drive system(s) 514. Furthermore, the drive system(s) 514 also include one or more communication connection(s) that enable communication by the respective drive system with one or more other local or remote computing device(s).

The computing device(s) 504 can include one or more processor(s) 516 and memory 518 communicatively coupled with the one or more processor(s) 516. In the illustrated example, the memory 518 of the computing device(s) 504 stores a localization component 520, a perception component 522, a prediction component 524, a planning component 526, the collision avoidance system 318, and one or more system controller(s) 528. Though depicted as residing in the memory 518 for illustrative purposes, it is contemplated that the localization component 520, the perception component 522, the prediction component 524, the planning component 526, the collision avoidance system 318 and the one or more system controller(s) 528 can additionally, or alternatively, be accessible to the computing device(s) 504 (e.g., stored in a different component of vehicle 502 and/or be accessible to the vehicle 502 (e.g., stored remotely)).

In memory 518 of the computing device(s) 504, the localization component 520 can include functionality to receive data from the sensor system(s) 506 to determine a position of the vehicle 502. For example, the localization component 520 can include and/or request/receive a three-dimensional map of an environment and can continuously determine a location of the autonomous vehicle within the map. In some instances, the localization component 520 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 520 can provide data to various components of the vehicle 502 to determine an initial position of an autonomous vehicle for generating a trajectory.

The perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 522 can provide processed sensor data that indicates one or more characteristics (also referred to as parameters) associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, a geographic position, an indication of darkness/light, etc.

The perception component 522 can include functionality to store perception data generated by the perception component 522. In some instances, the perception component 522 can determine a track corresponding to an object that has been classified as an object type. For purposes of illustration only, the perception component 522, using sensor system(s) 506 can capture one or more images of an environment. The sensor system(s) 506 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (collections of historical positions, orientations, sensor features, etc. associated with the object over time) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 524 can generate one or more probability maps representing prediction probabilities of possible locations of one or more objects in an environment. For example, the prediction component 524 can generate one or more probability maps for vehicles, pedestrians, animals, and the like within a threshold distance from the vehicle 502. In some instances, the prediction component 524 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 526 can determine a path for the vehicle 502 to follow to traverse through an environment. For example, the planning component 526 can determine various routes and paths and various levels of detail. In some instances, the planning component 526 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 526 can generate an instruction for guiding the autonomous vehicle along at least a portion of the route from the first location to the second location. In at least one example, the planning component 526 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 526 can alternatively, or additionally, use data from the perception component 522 to determine a path for the vehicle 502 to follow to traverse through an environment. For example, the planning component 526 can receive data from the perception component 522 regarding objects associated with an environment. Using this data, the planning component 526 can determine a route to travel from a first location (e.g., a current location) to a second location (e.g., a target location) to avoid objects in an environment. In at least some examples, such a planning component 526 may determine there is no such collision free path and, in turn, provide a path which brings vehicle 502 to a safe stop avoiding all collisions and/or otherwise mitigating damage.

In at least one example, the system controller(s) 528 can be configured to control steering, propulsion, braking, safety, emitters, communication, and other systems of the vehicle 502. These system controller(s) 528 can communicate with and/or control corresponding systems of the drive system(s) 514 and/or other components of the vehicle 502, which may be configured to operate in accordance with a path provided from the planning component 526 and/or with a maneuver provided by the collision avoidance system 318.

The vehicle 502 can connect to computing device(s) 530 via network(s) 532 and can include one or more processor(s) 534 and memory 536 communicatively coupled with the processor(s) 534. In at least one instance, the processor(s) 534 can be similar to the processor(s) 516 and the memory 536 can be similar to the memory 518. In the illustrated example, the memory 536 of the computing device(s) 530 stores a scenario component 538, a log data processing component 540, an exposure metric determination component 542, a severity metric determination component 544, a controllability metric determination component 546, and a safety goal determination component 548. These components may correspond to the similarly named components of FIG. 1, respectively. Though depicted as residing in the memory 536 for illustrative purposes, it is contemplated that the components can additionally, or alternatively, be accessible to the computing device(s) 530 (e.g., stored in a different component of the computing device(s) 530) and/or be accessible to the computing device(s) 530 (e.g., stored remotely).

The processor(s) 516 of the computing device(s) 504 and the processor(s) 534 of the computing device(s) 530 can be any suitable processor capable of executing instructions to process data and perform operations as described herein. By way of example and not limitation, the processor(s) 516, 534 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 of the computing device(s) 504 and the memory 536 of the computing device(s) 530 are examples of non-transitory computer-readable media. The memory 518 and 536 can store an operating system and one or more software applications, instructions, programs, and/or data to implement the methods described herein and the functions attributed to the various systems. In various implementations, the memory 518 and 536 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 518, 536 can be implemented as a neural network.

Example Clauses

A: An example method comprising: receiving a driving log comprising driving data associated with a plurality of trips of vehicles in an environment; determining a driving scenario associated with a malfunction of an autonomous vehicle in the environment; determining, from the driving log, a plurality of instances of the driving scenario associated with the malfunction and having a threshold probability of causing a hazardous event involving the autonomous vehicle and an object in the driving scenario; determining, based on the plurality of instances, an exposure metric associated with the driving scenario in the environment; determining, based at least in part on the driving data from the driving log associated with the instances, a severity metric associated with severity of the hazardous event; determining, based at least in part on the driving data from the driving log associated with the instances, a controllability metric associated with a likelihood that the object can mitigate an outcome of the hazardous event; determining, based on the exposure metric, the severity metric, and the controllability metric, a safety goal for an autonomous vehicle operating in the environment; determining one or more vehicle control parameters associated with the safety goal; and configuring the autonomous vehicle for travelling in the environment in accordance with the one or more vehicle control parameters.

B: The method of example A, further comprising: determining, based at least in part on a number of instances or a time associated with the instances, a probability that the autonomous vehicle will experience the driving scenario, wherein the exposure metric is based at least in part on the probability.

C: The method of example A or example B, wherein the determining the probability comprises: determining a duration of the instances; and determining a percentage of the duration of the instances to an overall driving duration in the driving logs, wherein the probability corresponds to the percentage.

D: The method of any one of example A through example C, further comprising: determining, for an instance of the plurality of instances, at least one of a position of the object relative to the autonomous vehicle, a velocity of the object, a velocity of the autonomous vehicle, an acceleration of the object, or an acceleration of the autonomous vehicle; simulating, based at least in part on kinematics associated with the autonomous vehicle, an outcome of the instance; and determining, based on the simulating the instance, a difference in velocity between the autonomous vehicle and the object and a time of collision, wherein the determining the severity metric is based at least in part on the difference in velocity.

E: The method of any one of example A through example D, further comprising: determining, for an instance of the plurality of instances, a time to collision between the autonomous vehicle and the object, wherein the determining the controllability metric is based at least in part on the time to collision.

F: The method of any one of example A through example E, wherein: the one or more vehicle control parameters comprise at least one of a minimum distance from an encountered object or a maximum speed.

G: An example system comprising: one or more processors; and memory storing executable instructions that, when executed by the one or more processors, cause the one or more processors to perform operations comprising: determining a driving scenario associated with an autonomous vehicle; determining, from driving logs generated from vehicles traversing an environment, instances of the driving scenario; determining, based on the instances, an exposure metric associated with the driving scenario in the environment; determining, based on driving data from the driving logs associated with the instances, one or more additional metrics associated with the driving scenario; determining, based on the exposure metric and the one or more additional metrics, a safety goal for an autonomous vehicle operating in the environment; and determining, based at least in part on the safety goal, one or more control parameters for controlling the autonomous vehicle to conform to the safety goal.

H: The system of example G, wherein the driving scenario comprises a scenario in which a malfunction has a threshold probability of causing a hazardous event including the autonomous vehicle and an object in the driving scenario.

I: The system of example G or example H, the operations further comprising: determining, based on the driving data from the driving logs associated with the instances, attributes of the object at the instances, wherein the determining the one or more additional metrics is further based at least in part on the attributes of the object.

J: The system of any of example G through example I, wherein the determining the exposure metric comprises determining, based at least in part on a number of instances or a time associated with the instances, a probability that the autonomous vehicle will experience the driving scenario.

K: The system of any of example G through example J, wherein the determining the probability comprises: determining a duration of the instances; and determining a percentage of the duration of the instances to an overall driving duration in the driving logs, wherein the probability corresponds to the percentage.

L: The system of any of example G through example K, the operations further comprising: determining, as the driving data from the driving logs associated with the instances, at least one of a position of an object relative to the autonomous vehicle, a velocity of the object, a velocity of the autonomous vehicle, an acceleration of the object, or an acceleration of the autonomous vehicle; simulating, based at least in part on kinematics associated with the autonomous vehicle, an outcome of the instances based at least in part on the driving data; determining, based on the simulating the outcome, at least one of a difference in velocity between the autonomous vehicle and the object, an impact angle associated with a simulated collision, or one or more attributes of the object; and determining a severity metric as the one or more additional metrics based at least in part on the at least one of the difference in velocity, the impact angle, or the one or more attributes of the object.

M: The system of any of example G through example L, wherein: the driving scenario is based at least in part on an object type, and the determining the severity metric is based at least in part on the object type.

N: The system of any of example G through example M, the operations further comprising: determining, from the driving data from the driving logs associated with the instances, a time to collision between the autonomous vehicle and the object; determining a field of view of the object; and determining a controllability metric as the one or more additional metrics based at least in part on the time to collision and the field of view of the object.

O: The system of any of example G through example N, wherein: the one or more vehicle control parameters comprise one or more of a minimum distance to maintain relative to an object or a maximum velocity for the autonomous vehicle in proximity of the object.

P: The system of any of example G through example O, wherein the driving scenario is associated with a fault injection which results in at least one of an unintended lateral movement of the autonomous vehicle, a loss of lateral movement controls, an unintended acceleration of the autonomous vehicle, a loss of acceleration controls, an unintended deceleration of the autonomous vehicle, or a loss of deceleration controls.

Q: One or more example non-transitory computer-readable media storing instructions that, when executed, cause one or more processors to perform operations comprising: determining a driving scenario; determining, from driving logs generated from vehicles traversing an environment, instances of the driving scenario; determining, based on the instances, an exposure metric associated with the driving scenario; determining, based on driving data from the driving logs associated with the instances, one or more additional metrics associated with the driving scenario; determining, based on the exposure metric and the one or more additional metrics, a safety goal for an autonomous vehicle operating in the environment; and determining, based at least in part on the safety goal, one or more control parameters for controlling the autonomous vehicle to conform to the safety goal.

R: The one or more example non-transitory computer-readable media of example Q, the operations further comprising: determining, as the driving data from the driving logs associated with the instances, at least one of a position of an object relative to the autonomous vehicle, a velocity of the object, a velocity of the autonomous vehicle, an acceleration of the object, or an acceleration of the autonomous vehicle; simulating, based at least in part on kinematics associated with the autonomous vehicle, an outcome of the instances based at least in part on the driving data; determining, based on the simulating the outcome, a difference in velocity between the autonomous vehicle and the object; and determining a severity metric as the one or more additional metrics based at least in part on the difference in velocity.

S: The one or more non-transitory computer-readable media of example Q or example R, the operations further comprising: determining, from the driving data from the driving logs associated with the instances, a time to collision between the autonomous vehicle and an object proximate the autonomous vehicle; determining a field of view of the object; and determining a controllability metric as the one or more additional metrics based at least in part on the time to collision and the field of view of the object.

T: The one or more non-transitory computer-readable media of any one of example Q through example S, wherein the one or more parameters comprise one or more of a minimum distance to maintain relative to an object or a maximum velocity for the autonomous vehicle in proximity of the object.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving a driving log comprising driving data associated with a plurality of trips of vehicles in an environment;
determining a driving scenario associated with a malfunction of an autonomous vehicle in the environment;
determining, from the driving log, a plurality of instances of the driving scenario associated with the malfunction and having a threshold probability of causing a hazardous event involving the autonomous vehicle and an object in the driving scenario;
determining, based on the plurality of instances, an exposure metric associated with the driving scenario in the environment;
determining, based at least in part on the driving data from the driving log associated with the instances, a severity metric associated with severity of the hazardous event;
determining, based at least in part on the driving data from the driving log associated with the instances, a controllability metric associated with a likelihood that the object can mitigate an outcome of the hazardous event;
determining, based on the exposure metric, the severity metric, and the controllability metric, a safety goal for an autonomous vehicle operating in the environment;
determining one or more vehicle control parameters associated with the safety goal; and
configuring the autonomous vehicle for travelling in the environment in accordance with the one or more vehicle control parameters.

2. The method of claim 1, further comprising:
determining, based at least in part on a number of instances or a time associated with the instances, a probability that the autonomous vehicle will experience the driving scenario,
wherein the exposure metric is based at least in part on the probability.

3. The method of claim 2, wherein the determining the probability comprises:
determining a duration of the instances; and
determining a percentage of the duration of the instances to an overall driving duration in the driving logs,
wherein the probability corresponds to the percentage.

4. The method of claim 1, further comprising:
determining, for an instance of the plurality of instances, at least one of a position of the object relative to the autonomous vehicle, a velocity of the object, a velocity of the autonomous vehicle, an acceleration of the object, or an acceleration of the autonomous vehicle;
simulating, based at least in part on kinematics associated with the autonomous vehicle, an outcome of the instance; and
determining, based on the simulating the instance, a difference in velocity between the autonomous vehicle and the object and a time of collision,
wherein the determining the severity metric is based at least in part on the difference in velocity.

5. The method of claim 1, further comprising:
determining, for an instance of the plurality of instances, a time to collision between the autonomous vehicle and the object,
wherein the determining the controllability metric is based at least in part on the time to collision.

6. The method of claim 1, wherein:
the one or more vehicle control parameters comprise at least one of a minimum distance from an encountered object or a maximum speed.

7. A system comprising:
one or more processors; and
memory storing executable instructions that, when executed by the one or more processors, cause the one or more processors to perform operations comprising:
determining a driving scenario associated with an autonomous vehicle;
determining, from driving logs generated from vehicles traversing an environment, instances of the driving scenario;
determining, based on the instances, an exposure metric associated with the driving scenario in the environment;
determining, based on driving data from the driving logs associated with the instances, one or more additional metrics associated with the driving scenario;
determining, based on the exposure metric and the one or more additional metrics, a safety goal for an autonomous vehicle operating in the environment; and
determining, based at least in part on the safety goal, one or more control parameters for controlling the autonomous vehicle to conform to the safety goal.

8. The system of claim 7, wherein the driving scenario comprises a scenario in which a malfunction has a threshold probability of causing a hazardous event including the autonomous vehicle and an object in the driving scenario.

9. The system of claim 8, the operations further comprising:
determining, based on the driving data from the driving logs associated with the instances, attributes of the object at the instances,
wherein the determining the one or more additional metrics is further based at least in part on the attributes of the object.

10. The system of claim 7, wherein the determining the exposure metric comprises determining, based at least in part on a number of instances or a time associated with the instances, a probability that the autonomous vehicle will experience the driving scenario.

11. The system of claim 10, wherein the determining the probability comprises:
determining a duration of the instances; and
determining a percentage of the duration of the instances to an overall driving duration in the driving logs,
wherein the probability corresponds to the percentage.

12. The system of claim 7, the operations further comprising:
determining, as the driving data from the driving logs associated with the instances, at least one of a position of an object relative to the autonomous vehicle, a velocity of the object, a velocity of the autonomous vehicle, an acceleration of the object, or an acceleration of the autonomous vehicle;
simulating, based at least in part on kinematics associated with the autonomous vehicle, an outcome of the instances based at least in part on the driving data;

determining, based on the simulating the outcome, at least one of a difference in velocity between the autonomous vehicle and the object, an impact angle associated with a simulated collision, or one or more attributes of the object; and determining a severity metric as the one or more additional metrics based at least in part on the at least one of the difference in velocity, the impact angle, or the one or more attributes of the object.

13. The system of claim 12, wherein:

the driving scenario is based at least in part on an object type, and the determining the severity metric is based at least in part on the object type.

14. The system of claim 12, the operations further comprising:

determining, from the driving data from the driving logs associated with the instances, a time to collision between the autonomous vehicle and the object;

determining a field of view of the object; and determining a controllability metric as the one or more additional metrics based at least in part on the time to collision and the field of view of the object.

15. The system of claim 7, wherein:

the one or more vehicle control parameters comprise one or more of a minimum distance to maintain relative to an object or a maximum velocity for the autonomous vehicle in proximity of the object.

16. The system of claim 7, wherein the driving scenario is associated with a fault injection which results in at least one of an unintended lateral movement of the autonomous vehicle, a loss of lateral movement controls, an unintended acceleration of the autonomous vehicle, a loss of acceleration controls, an unintended deceleration of the autonomous vehicle, or a loss of deceleration controls.

17. One or more non-transitory computer-readable media storing instructions that, when executed, cause one or more processors to perform operations comprising:

determining a driving scenario;

determining, from driving logs generated from vehicles traversing an environment, instances of the driving scenario;

determining, based on the instances, an exposure metric associated with the driving scenario;

determining, based on driving data from the driving logs associated with the instances, one or more additional metrics associated with the driving scenario;

determining, based on the exposure metric and the one or more additional metrics, a safety goal for an autonomous vehicle operating in the environment; and determining, based at least in part on the safety goal, one or more control parameters for controlling the autonomous vehicle to conform to the safety goal.

18. The one or more non-transitory computer-readable media of claim 17, the operations further comprising:

determining, as the driving data from the driving logs associated with the instances, at least one of a position of an object relative to the autonomous vehicle, a velocity of the object, a velocity of the autonomous vehicle, an acceleration of the object, or an acceleration of the autonomous vehicle;

simulating, based at least in part on kinematics associated with the autonomous vehicle, an outcome of the instances based at least in part on the driving data;

determining, based on the simulating the outcome, a difference in velocity between the autonomous vehicle and the object; and determining a severity metric as the one or more additional metrics based at least in part on the difference in velocity.

19. The one or more non-transitory computer-readable media of claim 17, the operations further comprising:

determining, from the driving data from the driving logs associated with the instances, a time to collision between the autonomous vehicle and an object proximate the autonomous vehicle;

determining a field of view of the object; and determining a controllability metric as the one or more additional metrics based at least in part on the time to collision and the field of view of the object.

20. The one or more non-transitory computer-readable media of claim 17, wherein the one or more parameters comprise one or more of a minimum distance to maintain relative to an object or a maximum velocity for the autonomous vehicle in proximity of the object.

* * * * *